(12) United States Patent
Williams et al.

(10) Patent No.: US 6,582,610 B2
(45) Date of Patent: Jun. 24, 2003

(54) CONCRETE GRINDINGS RECLAMATION SYSTEM

(75) Inventors: Clifton T. Williams, Votaw, TX (US); Barry Lynn Sorteberg, Bklfd, CA (US)

(73) Assignee: Varco I/P, Inc., Houston, TX (US)

( * ) Notice: Subject to any disclaimer, the term of this patent is extended or adjusted under 35 U.S.C. 154(b) by 141 days.

(21) Appl. No.: 09/893,318

(22) Filed: Jun. 27, 2001

(65) Prior Publication Data

US 2003/0006194 A1 Jan. 9, 2003

(51) Int. Cl.[7] .................................................. C02F 1/38
(52) U.S. Cl. .......................... 210/712; 106/757; 209/5; 210/738; 210/768; 210/787; 210/780; 210/806; 241/24.12; 241/DIG. 38
(58) Field of Search ................................ 106/756, 757; 209/5; 210/702, 712, 713, 729, 732, 738, 768, 780, 787, 806; 241/24.12, 29, DIG. 38

(56) References Cited

U.S. PATENT DOCUMENTS

| | | | |
|---|---|---|---|
| 3,954,069 A | 5/1976 | Loken | 110/8 R |
| 4,330,411 A | 5/1982 | Florin et al. | 210/769 |
| 4,548,507 A | 10/1985 | Mathis et al. | 366/20 |
| 4,784,603 A | 11/1988 | Robak, Jr. et al. | 432/5 |
| 4,870,911 A | 10/1989 | Chang et al. | 110/240 |
| 5,111,756 A | 5/1992 | Anderson | 110/240 |
| 5,117,771 A | 6/1992 | Summers | 110/346 |
| 5,133,901 A | 7/1992 | Peterson et al. | 252/626 |
| 5,142,998 A | 9/1992 | Feitel | 110/215 |
| 5,143,481 A | 9/1992 | Schumacher et al. | 405/129 |
| 5,148,757 A | 9/1992 | McCrossan | 110/216 |
| 5,149,192 A | 9/1992 | Hamm et al. | 366/8 |
| 5,178,077 A | 1/1993 | Norris et al. | 110/347 |
| 5,199,354 A | 4/1993 | Wood | 110/241 |
| 5,268,111 A | 12/1993 | Metz et al. | 210/712 |
| 5,492,620 A | 2/1996 | Evans | 210/96.1 |
| 5,554,297 A * | 9/1996 | Tanii | 210/703 |
| 5,570,749 A | 11/1996 | Reed | 175/66 |
| 5,642,961 A | 7/1997 | Campbell | 404/81 |
| 5,685,978 A | 11/1997 | Petrick et al. | 210/241 |
| 5,699,969 A | 12/1997 | Isaji | 241/24.12 |
| 5,824,210 A | 10/1998 | Kuryluk | 209/3 |
| 5,833,863 A | 11/1998 | Richards et al. | 210/712 |
| 5,843,315 A | 12/1998 | Baughn et al. | 219/723 |
| 6,036,870 A | 3/2000 | Briant et al. | 210/781 |
| 6,234,762 B1 * | 5/2001 | Lucas | 417/126 |

OTHER PUBLICATIONS

Dewatering Technology, Phoenix Proces Equipment Co. brochure, cited in U.S. 5,833,863; Nov. 10, 1998.
The Time Machine For Concrete, Rapid Int'l Ltd., 1995.
We Will Put Our Money Where Our Mouth Is, Henry Mfg. Co., 1995.
Concrete Reclaimer, Rapid Int'l Ltd., 1995.

(List continued on next page.)

Primary Examiner—Peter A. Hruskoci
(74) Attorney, Agent, or Firm—Guy McClung

(57) ABSTRACT

A method for treating a fluid slurry with concrete grindings to separate constituents thereof, the constituents including water, sand and cement particles, the method including removing solids (e.g. large concrete fragments, rock, etc.) from fluid slurry with vibratory separation apparatus, the vibratory separation apparatus having screen apparatus for separating materials, the vibratory separation apparatus producing wet solids flowing off the top of the screen apparatus and a fluid stream containing water and cement particles, the fluid stream discharged beneath the screen apparatus, feeding at least a portion of the fluid stream to centrifuge apparatus, and separating cement particles from the fluid stream with the centrifuge apparatus and producing a stream of water with the centrifuge apparatus; and re-usable cement particles recovered using such a method.

18 Claims, 2 Drawing Sheets

OTHER PUBLICATIONS

Ready Mix Reclaim System Model 604, Linatex corp. of America, 1990.
Type TK Automatic High–Speed Filter Press for Ready–Mixed Concrete Plants, Onoda Corp., 1995.
SDW–25 System, Brandt/EPI, 1995.
Reclaim lost concrete material profits, The Vince Hagan Co., 1995.
Vacuum Assisted Cyclone Separator, Brandt/EPI, 1996.
HS–3400 Decanting Centrifuge, The Brandt Co., 1995.
Redi–Claim (tm), Jadair Incorporated, 1999.

* cited by examiner

CONCRETE GRINDINGS RECLAMATION SYSTEM

BACKGROUND OF THE INVENTION

1. Field of the Invention

This invention is directed to: systems and methods for dewatering materials; to concrete treatment and reclamation; reclamation of components of solidified concrete and of slurries thereof; treatment of components of such mixtures; and disposal thereof.

2. Description of Related Art

The surface of concrete roadways often deteriorates and degrades so that the surface, which was relatively smooth when the roadway was made, becomes uneven and rough. Such uneven rough surfaces can be smoothed out by removing a top portion of the roadway. In certain prior art systems grinding apparatus grinds away a top portion of such a concrete roadway. Ground off concrete is removed in a fluid slurry as the grinding operation proceeds.

In the past, the fluid slurry has been dumped on the side of a roadway or transported from the site of the roadway to an earthen pit or landfill. Today this is not feasible due to, among other things, the high pH of the material which renders it hazardous. In certain prior art methods in which the material is treated off site, a typical price for the treatment and disposal of one truckload is about $38,000.

Often solidified concrete is ground up to produce concrete grindings from which concrete solids are reclaimed. Typically an average cubic yard of concrete weighs about 3500 pounds, of which about 1500 pounds is coarse aggregate (e.g. rock between +4 sieve size or mesh and −2 inches, i.e. the pieces have a largest dimension of 2 inches and the pieces with a smallest dimension are captured on a 4 mesh screen) contains about 1500 pounds of fine aggregate (e.g. rock and sand between +200 mesh and −4 mesh); about 300 pounds of water; injected air and soaps as desired; binders; cement; fly ash; fiber; and various chemicals. Aggregate particle size ranges include boulders, cobbles, coarse aggregate, fine aggregate, and mineral filler, which are defined in terms of particle size as follows:

| Designation | Size Range |
| --- | --- |
| Boulders: | 6 inches and larger |
| Cobbles: | 3 to 6 inches |
| Coarse aggregate: | No. 4 sieve size to 3 inches |
| Fine aggregate: | No. 200 to No. 4 sieve sizes |
| Mineral filler: | Smaller than No. 200 sieve size |

Boulders and cobbles are found in naturally occurring deposits. They can be crushed and sized to produce coarse and fine aggregate. Mineral filler is a flour-size material that is produced from aggregate crushing and processing.

Aggregate is used as a component of portland cement concrete (PCC), asphalt concrete, or in other construction materials. Aggregate represents 70 to 85% by weight (60 to 75% by volume) of PCC and 90 to 95% by weight (75 to 85% by volume) of asphalt concrete mixtures. The workability, strength, durability, moisture susceptibility, and performance of these construction materials are influenced greatly by the aggregate characteristics.

There is a need for a concrete treatment that is efficient for the reclamation, treatment and proper disposal of cement solids and other materials. There has long been a need for such a system which efficiently produces re-usable cement solids.

SUMMARY OF THE PRESENT INVENTION

The present invention, in certain aspects, discloses a system for handling a fluid slurry containing water and concrete ground from a roadway. The system according to the present invention can be provided on-site where the roadway grinding operation occurs or at a site remote from the location of the grinding operation. When the system according to the present invention is present on-site, system components are mounted on appropriate skids and/or trailers. In one such aspect the entire system is mobile. When the system according to the present invention is located at a site remote from the grinding operation, typical ground emplacement of system components is utilized.

In certain aspects such a system produces three products from concrete grindings (or three waste streams): 1.) sand (i.e., all particles passing through a screen of known mesh, e.g., but not limited to 200 mesh; 2.) cement paste (fine particles of cement and fine ground particles, e.g. of rock, from a grinding process; and 3.) water. In certain embodiments all (100%) slurry components are reclaimed and can be re-used.

In certain embodiments a system for handling and treating a fluid slurry with water and ground-up concrete includes a vibratory separator to which the slurry is fed. The vibratory separator has one or more screens or screen assemblies which screen solids from the slurry and produce a stream of water with some solid slurry components still remaining therein.

Solids screened out by the screen(s) flow from the vibratory separator for collection and/or disposal. The stream with water and some solid slurry components is then fed to a decanting centrifuge (either on-site with the vibratory separator or remote therefrom) which further separates the water from the remaining solid components. Clean water produced by the centrifuge is collected and stored; fed to other points in the system; and/or returned to the grinding operation. Optionally this clean water is filtered for further purification. Optionally, a flocculant is added to the stream coming from the vibratory separator prior to its introduction to the centrifuge to facilitate centrifugation of the fluid.

In embodiments in which the slurry is transported in trucks from the grinding location, a pump apparatus pumps the slurry from the trucks to the vibratory separator. Optionally, an air or an air/water sparge may be used within the trucks to facilitate removal of the slurry therefrom.

Fluid flowing from the vibratory separator is, in one aspect, collected in a tank which has one, two, three, four, or more agitators to maintain fluid homogeneity prior to fluid feed to the centrifuge.

The present invention, in certain embodiments, discloses and teaches a system and method for treating concrete grindings to reclaim constituents thereof, and, in one aspect, for preparing certain of the constituents for either re-use or safe disposal. Concrete grindings are produced from large pieces of concrete ground up in a grinding unit. A portable grinding unit may be used.

In certain methods according to the present invention a slurry is formed in the grinding unit that includes concrete, cement solids, and water. The slurry is then pumped to a vibratory separator to separate sand in the grindings from the slurry of material. In one particular aspect the vibratory separator is a shale shaker with fine mesh screens.

The resulting fluid stream with some components removed (in certain aspects, at least 90% of the sand is removed is then fed to one, two, or more centrifuges (e.g. decanting centrifuges) to separate cement solids in the fluid stream from the water in the fluid stream. The fluid stream may contain traces of silt or soil from the concrete's surface which are also removed in the system according to the present invention.

The water from the centrifuge(s) may be cleaned and treated with a polymer. The pH of the resulting clean water is, if needed, adjusted so that the clean water is pH neutral. This may be accomplished by adding chemicals, e.g. acid, e.g. muriatic acid, hydrochloric acid or phosphoric acid to the clean water. Optionally the cleaned pH adjusted water may be filtered to remove undesirable material, e.g. sediment or colloidal size solids. The resulting water may then be disposed of or used again in the system (e.g. returned to a container, tank, and or truck; e.g., for re-use in the grinding operation).

Sand and other components produced by the vibratory separator may be collected for re-use or disposal in suitable bins or receptacles. Cement solids, typically in the form of a paste, flowing from the centrifuge(s) may also be collected in suitable bins or receptacles.

It is, therefore, an object of at least certain preferred embodiments of the present invention to provide:

New, useful, unique, efficient, nonobvious systems and methods for handling and treating a slurry with water and concrete grindings to reclaim constituents thereof for re-use and/or safe disposal;

Such systems that use one or more vibratory separators and/or one or more decanting centrifuges; and Such systems that produce safely disposable cleaned and/or reusable water and/or reusable cement solids.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
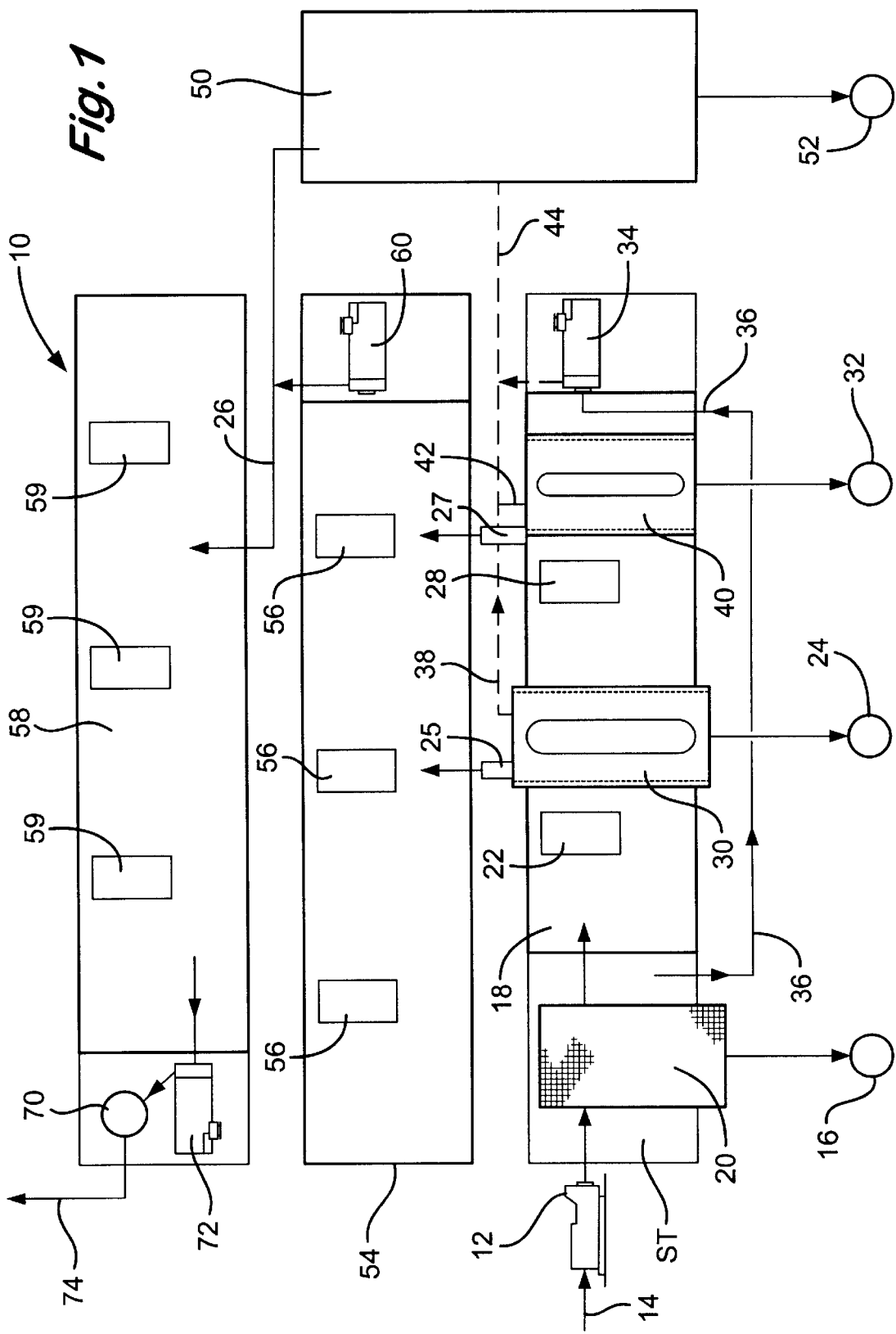
FIG. 1 is a schematic view of a system according to the present invention.

Referring now to FIG. 1, a system 10 according to the present invention has a pump 12 that pumps a concrete grindings slurry in a line 14 to a vibratory separator 20, e.g. but not limited to a commercially available Brandt King Cobra shale shaker with, e.g. 200 mesh screens or a Brandt Viper Shale Shaker. Alternatively, the concrete grindings or a slurry with them is gravity fed, e.g. but not limited to, from a truck to the shaker's feed hopper. Sand, cement particles, solids in the slurry, and concrete fragments screened out of the slurry by the vibratory separator 20 are collected in a bin 16. Fluid from the slurry that flows through the screen(s) of the vibratory separator flows through the shaker's screens into a tank 18 in which it is agitated by agitator apparatuses 22, 28 to maintain cement solids in suspension. The thus-agitated material is then fed to a centrifuge 30 and to a centrifuge 40. The centrifuges 30 and 40 operate in parallel to produce clear water effluent. The clear water effluent is fed or pumped into a tank 54 via lines 38, 42, and 44 (e.g. pumped by pumps 25, 27). Separated solids (e.g. cement solids and/or cement paste) flow away from the centrifuges 30, 40 to collection points 24, 32 respectively for collection (e.g. in a bin) and/or disposal. If desired flocculant is added to the effluent from the vibratory separator 20 prior to feeding the fluid to the centrifuges 30, 40. Any suitable known flocculant may be used. These flocculants enhance the solids removal capability of the centrifuges 30 and 40.

Clean water from the tank 54 may be pH adjusted by combining it in a line 26 with pH adjusted water from a dewatering unit 50 which receives water from the centrifuges 30, 40 and/or from the vibratory separator 20 (via line 36 pumped by pump 34 to line 44). Preferably the pH of the water in line 26 is 7, i.e. the water is neutralized. This water is then pumped with a pump 60 to a tank 58 with one or more agitators 59. The water is pumped by a pump 72 from the tank 58 to an optional filter apparatus 70 to remove sediment and/or trace elements, etc. from the water. The filtered water then flows from the filter apparatus in a line 74 for disposal or re-use.

In another embodiment a system according to the present invention provides handling and treatment for a fluid slurry that includes water and grindings from a concrete roadway produced by grinding apparatus used to remove a top portion of such a roadway to smooth out a rough roadway surface. These grindings include the components of the concrete roadway e.g. cement, sand, aggregate, concrete and fragments thereof.

Such a system receives the fluid slurry and feeds it to a vibratory separator (e.g. but not limited to a typical shale shaker as used in the drilling industry to treat drilling fluid with solids entrained therein). The vibratory separator ("shaker") produces fluid (which typically is discharged from the bottom of the shaker) and separated solids screened out from the fluid slurry by one, two or more screens or screen assemblies on the shaker. These separated solids, which contain, among other things, cement and/or cement paste (fine particles of cement and solids which are produced through the grinding process) exit from an exit end of the shaker for collection, further treatment, and/or disposal.

The fluid from the shaker is, optionally, agitated to maintain homogeneity and/or optionally treated with a flocculant to facilitate centrifugation. The fluid is fed to a centrifuge which produces clean water and centrifuged separated solids. the separated solids from the centrifuge also contain cement and/or cement paste which are discharged from the centrifuge for collection, further treatment, and/or disposal.

The water from the centrifuge is fed to a tank for storage or for further processing. In one aspect the water is fed to a filter apparatus. The filtered water is stored or is fed to the grinding system (in an on-site embodiment) or is fed to mobile tanks or trucks for transport back to the grinding site for re-use in the grinding operation. In one particular aspect a truck which brings a load of the fluid slurry for treatment by a system according to the present invention is filled with the filtered water—either water which originated with that same truck or water from a previous truck's load.

Figure 2:
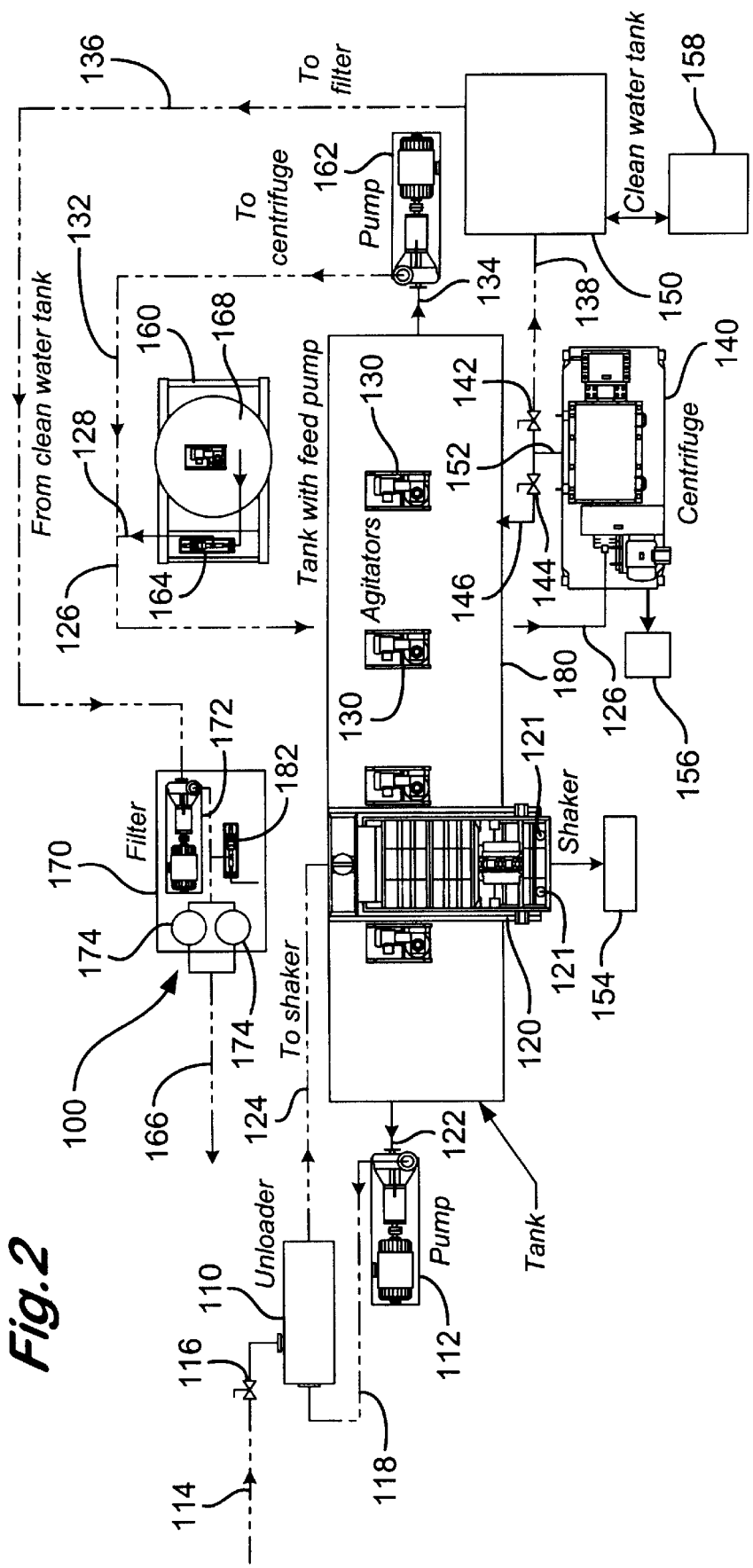
FIG. 2 is a schematic view of a system according to the present invention.

FIG. 2 shows a system 100 according to the present invention in which an unloader 110 pumps incoming fluid slurry from a grinding operation in a line 114 to a line 124 to a shaker 120. A valve 116 selectively controls flow in the line 114. The unloader 110 may pump fluid slurry from a truck with a tank, from a tank on a trailer, or from a vessel on-site at the grinding operation. Alternatively on-site the fluid slurry from the grinding operation is fed directly to the shaker 120. Two or more shakers feeding into one tank or into multiple tanks may be used.

The shaker 120 produces separated fluid which flows down from the shaker into a tank 180. Separated solids exit from the top surface of a screen assembly in the shaker and are collected at 154 (e.g. a pile on the ground, in a bin or in a container). In one particular aspect the shaker is a commercially available Brandt Viper™ shaker with tandem screen assemblies one over the other which remove solids with a largest dimension of 200 microns. Typically these solids will contain concrete fragments from the grinding operation (e.g. up to ¼" in largest dimension or more); cement paste; and sand (200 micron or larger particles). In one aspect commercially available Brandt Pinnacle™ screen assemblies with mesh between 110 mesh to 50 mesh are used. In one aspect a commercially available venturi-effect pump (e.g. a Halco Co. or Harrisburg Co. 5×6 centrifugal pump 1 with a jet that acts as a venturi siphon into which solids are fed from the 5×6 pump and then introduced onto a shaker screen) which can handle fine solids with minimal or no plugging is used from a Brandt DG 5 Degasser. A pump 112 provides a charge of fluid in a line 122 from the tank 180 in a line 118 to the unloader 110 to initially prime it to commence pumping.

Often when cement grindings are processed by the shaker 120 foam is produced by a chemical reaction in the grindings. To break down this foam one, two, or more water sprayers 121 (two in FIG. 2) are used mounted above the shaker screens. In one aspect these sprayers are mounted near the exit end of the shaker and their spray pattern encompasses substantially all of the width of the screen. In a particular embodiment each sprayer has a one-sixty fourth inch orifice and about three to four gallons of clean water a minute flow through each sprayer.

Optional agitators 130 (two shown, three, four or more may be used) help to maintain fluid homogeneity and to keep solids in suspension prior to feeding the fluid to the centrifuge 140.

A pump 162 pumps the fluid from the tank 180 in a line 132 past an optional treatment apparatus 160 which introduces a flocculant into the fluid to facilitate centrifugation. Flocculant feed apparatus 168 feeds flocculant and a pump 164 pumps it in a line 128 to the fluid in the line 132. The thus-treated water is then pumped to the centrifuge 140. A flocculant is used which is suitable for the particular fluid and particular solids entrained therein. In one particular aspect a commercially available anionic flocculant with the trade name "E 24" from Ciba Co. is used in a dry powdered form. In one embodiment dry powder flocculant is mixed with fresh water (e.g. 1% powder to 99% water by weight. Then this 1% solution is fed into line 132. In one aspect about twenty pounds of this flocculant are used for about three hundred and thirty six gallons of fluid.

Preferably the centrifuge 140 is a decanting centrifuge. Any suitable commercially available decanting centrifuge may be used; e.g., but not limited to, a Brandt Co. Model CF1. Preferably such a centrifuge removes solid particles down to 8 microns in largest dimension and most preferably down to 5 microns in largest dimension. Alternatively, two, three, four or more centrifuges 140 may be used. In one aspect, one centrifuge is used to deal with the output of six producing grinders.

Clean water from the centrifugation process flows in lines 152 and 138 to a tank 150. A valve 142 selectively controls flow in the line 138. Optionally, clean water may be added to the tank 180 via lines 152 and 146. A valve 144 selectively controls flow in the line 146. A reserve clean water supply 158 may provide additional clean water as needed to the tank 150 and/or may receive clean water from the tank 150.

A pump 172 of a filter apparatus 170 may, optionally, pump water from the tank 150 to the filter apparatus 170 to filter the water to remove, e.g. solid particles with a 100 micron largest dimension and, in one aspect, with a 50 micron largest dimension. Any suitable known filter apparatus may be used, including, but not limited to, an R. B. Weaver Co., Cartridge Filter Unit with replaceable filter cartridges 174. Filtered water flows in a line 166 from the filter apparatus 170. Optionally a pH lowering system may be used; e.g. to pump acid into the water to lower the pH.

In one particular method for using a system 100, a truck with about 5000 gallons of grinding slurry (about 40% solids by weight—including about 15% sand, about 60% water, and about 25% cement paste which itself is about 50% water by weight) is emptied with an unloader 110. An air sparger with a long tubular member may be inserted into the truck to facilitate evacuation. The slurry is fed to a shaker that produces about 200 gallons (about a cubic yard) of solids (e.g. fed to a bin at 154, FIG. 2) and about 4800 gallons of discharged fluid (into tank 180, FIG. 2). The centrifuge produces from the total feed from the shaker about 4000 gallons of water and about 3 to 4 cubic yards of solids. These solids from the centrifuge have, preferably, a water content of between about 48% to 55% (by weight) depending on the % solids by weight in the initial incoming slurry. In one aspect the pump 162 pumps about 100 to 110 gallons a minute to the centrifuge 140 and the unloader 110 pumps about 1000 gallons a minute to the shaker 120.

In one aspect from 5000 gallons (weight about 53,000 pounds) of incoming grindings slurry, about 10,600 pounds of cement paste are recovered by the centrifuge. About 20% of the cement paste is reusable cement.

The present invention, therefore, in some, but in not necessarily all embodiments, provides a method for treating a fluid slurry with concrete grindings to separate constituents thereof, the constituents including water, cement particles, and solids, the method including treating the fluid slurry with vibratory separation apparatus, the vibratory separation apparatus having screen apparatus for separating materials, the vibratory separation apparatus producing wet solids flowing off the top of the screen apparatus and a fluid stream containing water and cement particles, the fluid stream discharged beneath the screen apparatus, feeding at least a portion of the fluid stream to centrifuge apparatus, and separating cement particles from the fluid stream with the centrifuge apparatus and producing a stream of water with the centrifuge apparatus. Such a method may include one or some of the following, in any possible combination: wherein flocculant is added to the fluid stream to facilitate its centrifugation; filtering at least a portion of the stream of water with filter apparatus to filter out undesirable material from the stream of water; wherein the fluid slurry is initially in an input tank, the method further including moving the fluid slurry from the input tank with an unloader apparatus that includes a venturi effect pump with apparatus to inhibit clogging of the pump by solids in the fluid slurry; wherein the input tank is on a truck; wherein at least a portion, at least 90% of, or at least 97% of the stream of water from the centrifuge apparatus is fed back into a truck tank of a truck for return to a site at which the fluid slurry is produced; pumping fluid from the collection tank to prime the venturi effect pump; collecting the fluid stream containing water and cement particles from the vibratory separation apparatus in a collection tank, and agitating with agitator apparatus the fluid stream in the collection tank; collecting the stream of water from the centrifuge apparatus in a water tank; adding water to the water tank from a reserve tank in fluid communication with the water tank; pumping fluid from the collection tank to prime the venturi effect pump; flowing at least a portion of the stream of water from the centrifuge apparatus to the collection tank; producing the fluid slurry with grinding apparatus that includes water feed apparatus; wherein the grinding apparatus is remote from the vibratory separation apparatus and/or remote from the centrifuge apparatus; wherein the vibratory separation apparatus and the centrifuge apparatus are located adjacent the grinding apparatus; wherein treating the fluid slurry with the vibratory separation apparatus produces foam, the method further including spraying the foam with water in the vibratory separation apparatus to break down the foam; and/or wherein at least 10% or at least 20% by weight of cement in the fluid slurry is separated therefrom.

The present invention, therefore, in some, but in not necessarily all embodiments, provides a method for treating a fluid slurry with concrete grindings to separate constituents thereof, the constituents including water, and cement particles, the method including removing cement particles from fluid slurry with vibratory separation apparatus, the vibratory separation apparatus having screen apparatus for separating materials, the vibratory separation apparatus producing wet cement solids flowing off the top of the screen apparatus and a fluid stream containing water and cement particles, the fluid stream discharged beneath the screen apparatus, feeding at least a portion of the fluid stream to centrifuge apparatus, and separating cement particles from the fluid stream with the centrifuge apparatus and producing a stream of water with the centrifuge apparatus, wherein flocculant is added to the fluid stream to facilitate its centrifugation, filtering at least a portion of the stream of water with filter apparatus to filter out undesirable material from the stream of water, and wherein the input tank is on a truck. Such a method may include one or some of the following, in any possible combination: pumping fluid from the collection tank to prime the venturi effect pump; producing the fluid slurry with grinding apparatus that includes water feed apparatus; wherein the grinding apparatus is remote from the vibratory separation apparatus and remote from the centrifuge apparatus; wherein the grinding apparatus is remote from the vibratory separation apparatus and remote from the centrifuge apparatus.

The present invention, therefore, in some, but in not necessarily all embodiments, provides cement particles recovered from a fluid slurry with concrete grindings, the cement grindings recovered by a method according to the present invention.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112.

What is claimed is:

1. A method for recovering water from a concrete grindings fluid slurry containing water, cement particles, and sand, the method comprising collecting the concrete grindings slurry from a concrete grinding apparatus that includes water feed apparatus and feeding said slurry to vibratory separation apparatus, treating the fluid slurry with the vibratory separation apparatus, the vibratory separation apparatus having screen apparatus for separating materials, the vibratory separation apparatus producing wet solids including said sand flowing off the top of the screen apparatus and a fluid stream containing water and cement particles, the fluid stream discharged beneath the screen apparatus, feeding at least a portion of the fluid stream to centrifuge apparatus, separating cement particles from the fluid stream with the centrifuge apparatus and producing a stream of water with the centrifuge apparatus, and returning said stream of water for re-use in the concrete grinding apparatus.

2. The method of claim 1 wherein flocculant is added to the fluid stream to facilitate its centrifugation.

3. The method of claim 1 further comprising filtering at least a portion of the stream of water with filter apparatus to filter out undesirable material from the stream of water.

4. The method of claim 1 wherein the fluid slurry is initially in an input tank, the method further comprising moving the fluid slurry from the input tank with an unloader apparatus that includes a venturi effect pump with apparatus to inhibit clogging of the pump by solids in the fluid slurry.

5. The method of claim 4 wherein the input tank is on a truck.

6. The method of claim 4 wherein at least a portion of the stream of water from the centrifuge apparatus is fad back into a truck tank of a truck for return to a sits at which the fluid slurry is produced.

7. The method of claim 4 further comprising collecting the fluid stream containing water and cement particles from the vibratory separation apparatus in a collection tank, and pumping fluid from the collection tank to prime the venturi effect pump.

8. The method of claim 1 further comprising collecting the fluid stream containing water and cement particles from the vibratory separation apparatus in a collection tank, and agitating with agitator apparatus the fluid stream in the collection tank.

9. The method of claim 1 further comprising collecting the stream of water from the centrifuge apparatus in a water tank.

10. The method of claim 9 further comprising adding water to the water tank from a reserve tank in fluid communication with the water tank.

11. The method of claim 1 further comprising flowing at least a portion of the stream of water from the centrifuge apparatus to a collection tank.

12. The method of claim 1 wherein the grinding apparatus is remote from the vibratory separation apparatus and remote from the centrifuge apparatus.

13. The method of claim 1 wherein the vibratory separation apparatus and the centrifuge apparatus are located adjacent the grinding apparatus.

14. The method of claim 1 wherein treating the fluid slurry with the vibratory separation apparatus produces foam, the method further comprising spraying the foam with water in the vibratory separation apparatus to break down the foam.

15. The method of claim 1 wherein at least 10% by weight of cement in the fluid slurry with concrete grindings is separated therefrom.

16. The method of claim 1 wherein at least 20% by weight of cement in the fluid slurry with concrete grindings is separated therefrom.

17. The method of claim 1 wherein at least 90% of the stream of water produced by the centrifuge apparatus is recovered for re-use in the concrete grindings apparatus.

18. A method for recovering water from a concrete grindings fluid slurry containing water, cement particles, and sand, the method comprising collecting the concrete grindings slurry from a concrete grinding apparatus that includes water feed apparatus and feeding said slurry to vibratory separation apparatus, treating the fluid slurry with the vibratory separation apparatus, the vibratory separation apparatus having screen apparatus for materials, the vibratory separation apparatus producing wet solids including said sand flowing off the top of the screen apparatus and a fluid stream containing water and cement particles, the fluid stream discharged beneath the screen apparatus, feeding at least a portion of the fluid stream to centrifuge apparatus, separating cement particles from the fluid stream with the centrifuge apparatus and producing a stream of water with the centrifuge apparatus, and returning said stream of water for re-use in the concrete grinding apparatus, filtering at least a portion of the stream of water with filter apparatus to filter out undesirable material from the stream of water, wherein at least a portion of the stream of water from the centrifuge apparatus is fed back into a truck tank of a truck for return to a site at which the fluid slurry is produced, wherein the grinding apparatus is remote from the vibratory separation apparatus and remote from the centrifuge apparatus, or wherein the vibratory separation apparatus and the centrifuge apparatus are located adjacent the grinding apparatus, and wherein at least 90% of the stream of water produced by the centrifuge apparatus is recovered for re-use in the concrete grindings apparatus.

\* \* \* \* \*